US012579548B2

(12) United States Patent
Bhatnagar et al.

(10) Patent No.: US 12,579,548 B2
(45) Date of Patent: Mar. 17, 2026

(54) METHOD AND SYSTEM FOR PREDICTING LIKELIHOOD OF RETURN OF A PRODUCT

(71) Applicant: LTI Mindtree Ltd, Mumbai (IN)

(72) Inventors: Nishant Bhatnagar, Mumbai (IN); Vaishali Mahesh Deshmukh, Mumbai (IN); Vijaya Rajan Shankar, Mumbai (IN); Akshay Rakesh Toshniwal, Mumbai (IN); Tamilselvan E., Mumbai (IN); Naveen Kumaar Subramanian, Mumbai (IN); Ganesan T., Mumbai (IN); Jai Goutham V., Mumbai (IN)

(73) Assignee: LTI Mindtree Ltd., Mumbai (IN)

( * ) Notice: Subject to any disclaimer, the term of this patent is extended or adjusted under 35 U.S.C. 154(b) by 0 days.

(21) Appl. No.: 18/813,422

(22) Filed: Aug. 23, 2024

(65) Prior Publication Data

US 2025/0335930 A1      Oct. 30, 2025

(51) Int. Cl.
  *G06Q 30/016*        (2023.01)
  *G06Q 10/0837*      (2023.01)
(52) U.S. Cl.
  CPC ....... *G06Q 30/016* (2013.01); *G06Q 10/0837* (2013.01)
(58) Field of Classification Search
  None
  See application file for complete search history.

(56) References Cited

U.S. PATENT DOCUMENTS

| | | | | |
|---|---|---|---|---|
| 8,306,942 B2 * | 11/2012 | Chen | ..................... | G06N 20/00 |
| | | | | 706/62 |
| 9,852,433 B2 * | 12/2017 | Patel | ................... | G06Q 30/016 |
| 2014/0108125 A1 * | 4/2014 | Maraz | ............... | G06Q 10/0837 |
| | | | | 705/14.39 |
| 2020/0160418 A1 * | 5/2020 | Zhu | .................... | G06Q 30/0202 |
| 2021/0012280 A1 * | 1/2021 | Paquin | .............. | G06Q 10/0838 |
| 2022/0366493 A1 * | 11/2022 | Arora | ................ | G06Q 20/4016 |
| 2023/0401528 A1 * | 12/2023 | Tessler | .............. | G06Q 30/0201 |
| 2025/0053993 A1 * | 2/2025 | Dar Mousa | .......... | G06Q 10/087 |

* cited by examiner

*Primary Examiner* — Paul S Schwarzenberg
(74) *Attorney, Agent, or Firm* — CHIP LAW GROUP

(57)      ABSTRACT

The present disclosure discloses a return prediction system and method for predicting a likelihood of return of a product. Static and dynamic data associated with the product is obtained using a data acquisition module, and is preprocessed using a preprocessing module, which involves applying a plurality of base classifiers. Individual prediction from each of the plurality of base classifiers is combined using a meta-classifier. The meta-classifier then processes the combined data to generate a final prediction indicating the likelihood of the product being returned. The meta-classifier generates the prediction at one or more stages such as, before purchase of the product, and post purchase of the product. Finaly, a notification module transmits notification based on the prediction to either a customer or a retailer associated with the product.

17 Claims, 3 Drawing Sheets

100

302
Obtain static data and dynamic data from a plurality of sources

304
Process the data using a stacking classification model to generate a prediction indicating the likelihood of the product being returned 306
Transmit a notification based on the prediction to at least one of the customer and a retailer associated with the product

METHOD AND SYSTEM FOR PREDICTING LIKELIHOOD OF RETURN OF A PRODUCT

CROSS-REFERENCE TO PRIOR APPLICATION

This application claims the benefit of and priority to Indian patent application No. 202421033812, filed on Apr. 29, 2024, which is hereby incorporated herein by reference in its entirety.

The entire contents of the priority application, including any appendices, exhibits, and amendments filed therewith, are hereby incorporated by reference in its entirety.

FIELD

Various embodiments of the present disclosure generally relate to predicting product returns. More particularly, the disclosure relates to a method and system for predicting likelihood of return of a product and notifying a retailer or a customer indicating the predicted likelihood along with preventive recommendations to mitigate returns and thereby improving customer satisfaction.

BACKGROUND

The e-commerce and retail industry has experienced exponential growth in recent years, with online shopping becoming increasingly prevalent in consumers' lives. This surge in online retail has brought forth numerous benefits, including convenience and accessibility, but has also presented challenges, particularly regarding product returns.

Returns have emerged as a significant issue within the industry, posing multifaceted challenges for retailers. Returns are a common occurrence in e-commerce, with an average returns rate ranging between 15-20%. However, certain product categories may experience higher return rates, reaching up to 20-30% due to various factors such as sizing issues, quality concerns, or customer preferences.

In addition to managing return percentages, it is essential to address the issue of damaged products being returned to the retailer. Approximately 20-30% of returned products are reported to come back damaged, which can significantly impact profits. Damaged products not only result in additional costs associated with reverse logistics, but also represent lost revenue opportunities if they cannot be resold at full price.

Notably, returns not only incur substantial costs for retailers but also disrupt supply chains, affect inventory management, and impact customer satisfaction and loyalty. Moreover, the unpredictable nature of returns further compounds these challenges, making it difficult for retailers to efficiently manage their operations and mitigate associated business risks.

Despite advancements in technology and the widespread adoption of e-commerce platforms in the retail industry, there remains a notable gap in the availability of solutions for predicting product returns effectively. Large software companies, which play a major role, have yet to offer comprehensive and reliable tools specifically designed to address the challenges of return prediction in retail and e-commerce platforms.

One of the primary reason for this gap is the inherent complexity of return prediction within the context of retail and e-commerce operations. Unlike traditional sales forecasting, which relies on historical sales data and market trends, return prediction involves variables and factors that are often difficult to quantify and analyze. Furthermore, the dynamic nature of e-commerce platforms, with their vast product catalogs and diverse customer base, presents unique challenges for developing accurate return prediction models.

Existing solutions within the industry attempt to address the challenge of predicting the likelihood of product returns. These solutions often leverage historical data, customer behavior analysis, and machine learning algorithms to forecast return probabilities. However, despite their efforts, current methods often fall short in providing retailers with accurate and actionable insights.

Many existing systems struggle to adapt to evolving consumer trends and fail to account for various factors influencing return behavior, such as product characteristics, customer preferences, and external market dynamics.

Therefore, there is a need for a method and system that can effectively predict the likelihood of return of a product to mitigate product returns and thereby improve customer satisfaction.

SUMMARY

The present disclosure discloses a computer implemented method for predicting a likelihood of return of a product. Data associated with the product such as, static data and dynamic data is obtained from a plurality of sources. Static data can be such as, but not limited to, customer data, product data, and dynamic data can be such as, but not limited to, transaction data, cookie data, live traffic data, weather data, and macro-economic data.

The computer implemented method preprocesses the obtained data using an ensemble of machine learning models that includes a plurality of base classifiers and a meta-classifier. Preprocessing the obtained data includes one or more steps such as cleaning the data, normalizing or scaling numerical features, converting categorical variables into numerical representations, and creating new features or transforming existing features. Further, preprocessing involves applying the plurality of base classifiers to the data, where each base classifier generates an individual prediction. Individual prediction from each base classifier is processed and combined using the meta-classifier to generate an aggregated final prediction indicating the likelihood of the product being returned.

The ensemble of machine learning models generates the prediction at one or more stages such as, before purchase of the product by a customer, and post purchase of the product but before delivery of the product.

The computer implemented method, based on the predicted likelihood of returns, generates and transmits notifications to either a customer or a retailer associated with the product. When the prediction is generated before the purchase of the product, the notification is transmitted to the customer with recommended actions to mitigate the chances of the product being returned. When the prediction is generated after the purchase of the product, the notification is transmitted to the retailer.

One or more advantages of the prior art are overcome, and additional advantages are provided through the disclosure. Additional features are realized through the technique of the disclosure. Other embodiments and aspects of the disclosure are described in detail herein and are considered a part of the disclosure.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION

Before describing in detail embodiments that are in accordance with the present disclosure, it should be observed that the embodiments reside primarily in combinations of components related to prediction of product returns in retail and e-commerce platforms. Accordingly, the method and system have been represented where appropriate by conventional symbols in drawing, showing only those specific details that are pertinent to understanding the embodiments of the present disclosure so as not to obscure the disclosure with details that will be readily apparent to those of ordinary skill in the art having the benefit of description herein.

Various embodiments of the disclosure disclose a method and system for predicting a likelihood of return of a product. The disclosure comprises a return prediction system built upon the robust capabilities of Artificial Intelligence (AI) and Machine Learning (ML) techniques. This AI/ML-based approach advances the existing methods by dynamically adapting variables and weightages employed for prediction.

Through the usage of AI and ML techniques, the return prediction system is enabled with the ability to continuously evolve and refine its predictive models. Unlike prediction models with static data, this dynamic framework ensures that the prediction process remains responsive to changing dynamics and customer behaviors.

As the return prediction system ingests and analyzes sales and return data, along with several dynamic variables, it leverages an ensemble of machine learning models to discern intricate patterns and correlations. This iterative learning process enables the platform to iteratively adjust the variables and weightages, optimizing prediction accuracy with each new data point.

Main objective of the AI enabled return prediction system is to preemptively identify and anticipate potential returns that customers may encounter when purchasing products through any channel, be it online or offline. By leveraging the AI/ML capabilities, the return prediction system aims to provide retailers and e-commerce businesses with actionable insights to mitigate the impact of returns and optimize their operational efficiencies.

Figure 1:
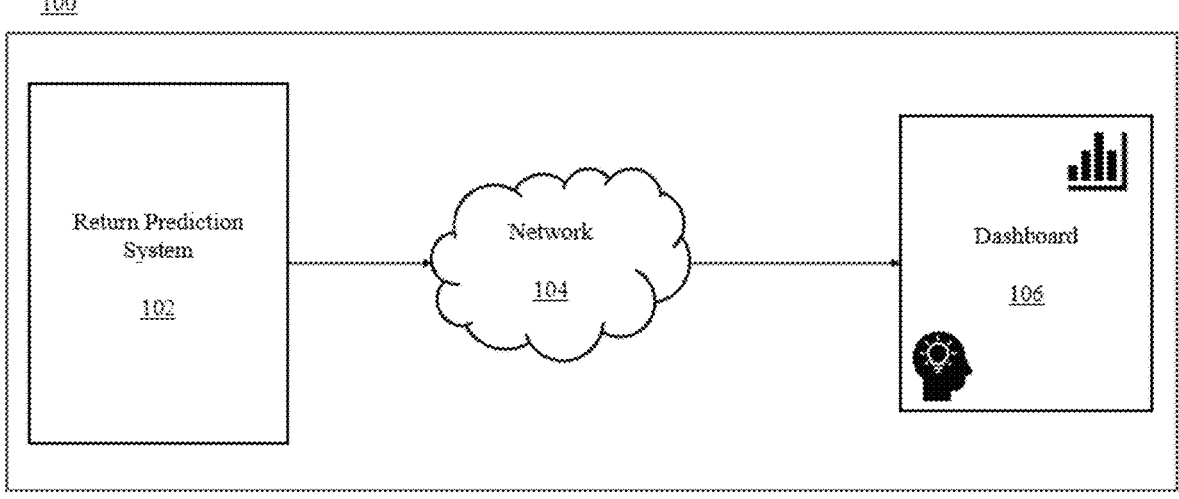
FIG. 1 illustrates an exemplary environment 100 within the method and system for prediction of likelihood of return of a product may function, in accordance with various embodiments of the disclosure.

FIG. 1 illustrates an exemplary environment 100 within the method and system for prediction of likelihood of return of a product may function, in accordance with various embodiments of the disclosure. Referring to FIG. 1, the environment 100 comprises a return prediction system 102, a network 104, and a dashboard 106.

The return prediction system 102 serves as a predictive tool for retailers to anticipate and address potential return instances before they occur. By efficiently analyzing data received from plurality of sources, including historical sales and returns, customer profiles, product attributes, market trends, and dynamic variables, the return prediction platform 102 generates predictive models that can forecast the likelihood of returns associated with specific products, and customers.

By preempting returns, the return prediction system 102 enables retailers to implement targeted strategies to minimize return rates and associated costs. For example, retailers can adjust product packing methods, optimize inventory management practices, adjust pricing strategies, to set accurate customer expectations, or offer personalized recommendations to mitigate potential return triggers.

The return prediction system 102 comprises an ensemble of machine learning (ML) models that consists of a plurality of base classifiers and a meta-classifier to generate the prediction indicating the likelihood of the product being returned. The plurality of base classifiers are connected to the meta-classifier in order to feed individual predictions to the meta-classifier, which aggregates them to produce a final prediction indicating the likelihood of the product being returned.

The base classifiers refer to individual learning algorithms or models that are trained to make predictions independently. The base classifiers may utilize different algorithms, feature representations, or training strategies, thereby offering diverse interpretations and predictions on the underlying data. The trained base classifiers generate predictions for each instance in the dataset, which are aggregated by the meta-classifier. The meta-classifier may employ various aggregation strategies such as, for instance, rating, averaging, weighted averaging, to synthesize the collective insights from the base classifiers into a prediction.

The principle behind using the ensemble of machine learning models is to leverage the collective knowledge of the plurality of base classifiers to improve prediction accuracy and robustness. Each base classifier is expected to capture different aspects of the data or exhibit varying degrees of bias and variance. By combining the predictions from the plurality of base classifiers, the ensemble of machine learnings model can mitigate the impact of individual classifier biases or errors, leading to more accurate and reliable predictions.

Moreover, the ensemble of machine learning models offers advantage in terms of model generalization and resilience to overfitting. By aggregating predictions from the plurality of base classifiers, the ensemble of machine learning models can capture a broad range of patterns and dependencies within the data, thereby enhancing its ability to generalize to unseen instances.

The network 104 includes communication networks operable to facilitate communication, either wirelessly or wired. Any of the communications networks may include, but are not limited to, any one of a combination of different types of suitable communications networks such as, for example, broadcasting networks, cable networks, public networks (for example, the Internet), private networks, wireless networks, cellular networks, or any other suitable private and/or public networks. Further, any of the communication networks may have any suitable communication range associated therewith and may include, for example, global networks (for example, the Internet), metropolitan area networks (MANs), wide area networks (WANs), local area networks (LANs), or personal area networks (PANs). In addition, any of the communications networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The return prediction system 102 is operable to communicate with the network 104 and may include logic encoded software, hardware, or a combination of software and hardware. More particularly, the return prediction system 102 may include software supporting one or more communication protocols associated with communication such that the network 104 is operable to communicate physical signals within and outside the dashboard 106.

The dashboard 106 serves as a tool for retailers offering valuable insights into various aspects of packaging and purchasing the product. The dashboard 106 provides a user-friendly interface, through which the retailers can access a wide range of outputs such as, for instance, key performance indicators (KPIs), reports, and data analytics, enabling informed decision-making and enhanced understanding of business performance.

In an embodiment, in addition to the real-time recommendations, the retailers can also access the dashboard 106 to view detailed insights into return rates across different product categories, customer segments, and sales channels. By analyzing return patterns, retailers can identify high-return products or customers and take proactive measures to mitigate returns.

Customers, while receiving real-time recommendations from the retailers, can also provide feedback and inputs to the retailers, allowing them to view them via the dashboard 106 to gain valuable insights into the reasons for returns and customer satisfaction levels. By analyzing the customer data, the retailers can identify common pain points for improvement, enabling targeted interventions to reduce returns.

Figure 2:
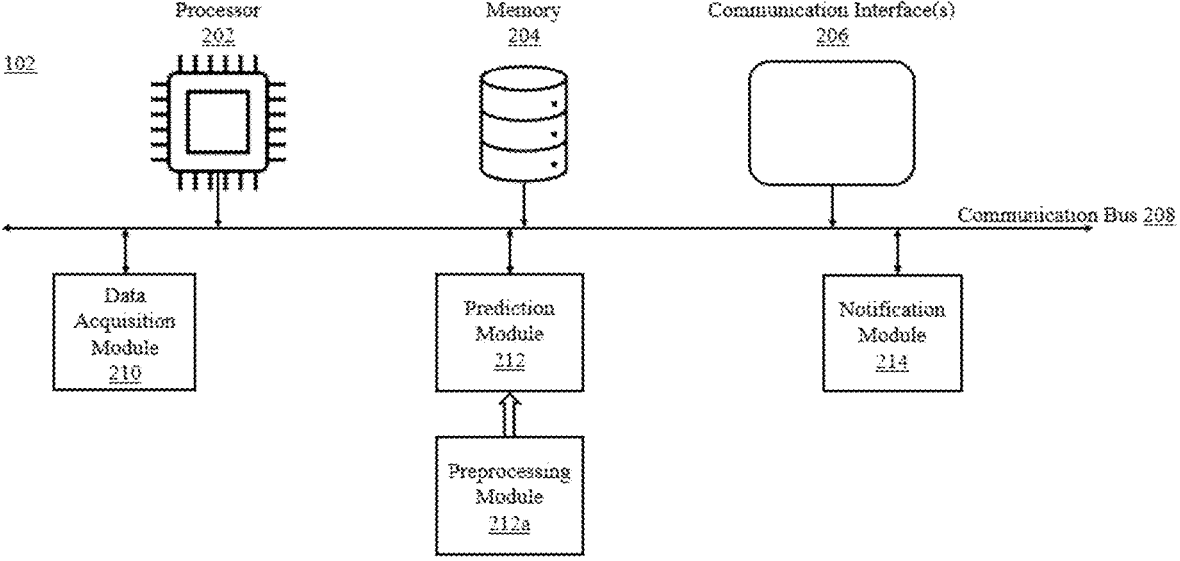
FIG. 2 is a diagram that illustrates the return prediction system 102 for predicting a likelihood of return of a product, in accordance with an embodiment of the disclosure.

FIG. 2 is a diagram that illustrates the return prediction system 102 for predicting a likelihood of return of a product, in accordance with an embodiment of the disclosure. Referring to FIG. 2, the return prediction platform 102 comprises a processor 202, a memory 204, one or more communication interface(s) 206, a communication bus 208, a data acquisition module 210, a prediction module 212, a preprocessing module 212a, and a notification module 214.

The processor 202 may comprise suitable logic, interfaces, and/or code that may be configured to execute the instructions stored in the memory 204 to implement various functionalities of the return prediction system 102 in accordance with various aspects of the present disclosure. The processor 202 may be further configured to communicate with various modules of the return prediction system 102 via the communication bus 208.

The memory 204 may comprise suitable logic, and/or interfaces, that may be configured to store instructions (for example, computer-readable program code) that can implement various aspects of the present disclosure.

The communication interface(s) 206 may include one or more interfaces to enable the return prediction system 102 to access a computer network such as a Location Area Network (LAN), a Wide Area Network (WAN), a Personal Area Network (PAN), or the internet through a variety of wired and/or wireless connections, including cellular connections.

The communication bus 208 is configured to serve the return prediction system 102, facilitating seamless communication, integration, and coordinating among its constituent components. Through its role as a centralized message broker, the communication bus 208 enables efficient data exchange, event-driven processing, and reliable communication, empowering the system to mitigate return predictions.

The data acquisition module 210 may comprise suitable logic, and/or interfaces that is configured to receive data associated with the product from a plurality of data source, wherein the data received from the plurality of data sources include static data and dynamic data.

Static data can be such as, but not limited to, customer data, product data, and Unified ID data. Customer data can further comprise demographic information, purchase history and browsing behavior. By segmenting customers based on demographics such as age, gender, and location, businesses can identify trends in return behavior among different demographic groups. For example, young customers might be more likely to return items due to fit or style preferences. Analyzing customer's past purchases and browsing behaviors help identify their preferences and interest. By understanding which products customers have previously purchased or shown interest in, retailers can anticipate their future purchasing decisions and potential return behavior.

Product data includes, but is not limited to, product attributes, product descriptions and images. Different product attributes such as size, color, brand, and material can influence return rates. For example, clothing items with sizing variations may result in higher return rates due to fit issues.

Accurate product descriptions and high-quality images are essential for setting accurate customer expectations. Misleading product descriptions or low quality can lead to higher return rates as customers may receive products that differ from what they expected.

Unified ID data refers to incorporating the data into the dataset to link individual customers across multiple devices or platforms, which provide a holistic view of customer behavior and interactions. Unified ID data is matched with customer profiles or transaction records using unique identifiers such as, for example, customer IDs, email addresses, etc. Unified ID-related features such as, cross-device interactions, user preferences, and customer journeys are included in the combined dataset, which indicates additional data other than cookies which will give holistic view of customer behavior and interaction.

Dynamic data can be such as, but not limited to, transaction data, cookie data, live traffic data, weather data, and macro-economic indicator data. Transaction data may include details such as order history and payment methods, shipping and return information. Analyzing a customer's past orders and payment methods provides insights into their purchasing behavior and preferences. For example, customers who frequently use expedited shipping options may have different return patterns than those who opt for standard shipping. Tracking shipping and return data helps businesses identify potential pain points in the fulfillment process that may lead to returns. For example, delays in shipping or issues with delivery accuracy can result in higher return rates.

Cookie data is collected from one or more website tracking tools or server logs. Cookie data may include information about user sessions, browsing behavior, and interactions with the website. Cookie data is linked with customer data using unique identifiers such as, for example, user IDs, session IDs, etc. Cookie data metrics such as, for example, session duration, pages viewed are aggregated over relevant time intervals. Cookie related features such as browsing patterns, session duration, and click-through rates, are included in the dataset.

In an embodiment, the cookie data is opt-out data where the customer logs in to an additional site or an application to access additional information. Opt-out data refers to data that users may have provided by default, but they have the option to opt-out or decline sharing.

In accordance with the embodiment, the obtained information from the cookie data, which is dynamic, is merged with the static data. For instance, if a customer has purchased a product from Brand A, and simultaneously the customer has also logged in to another site and has got a better discount. In this scenario, there are chances that the customer might cancel the old order and buy from another site.

Live traffic data is considered to be more relevant in the prediction of returns for specific types of products where a customer needs delivery during a particular time window. Live road traffic data can impact product returns in ecommerce by delaying delivery times, leading to customer dissatisfaction and potential returns due to missed delivery windows or urgent needs. Additionally, increased traffic may result in delivery vehicles being stuck in transit, causing delays or even damage to products, prompting customers to return products.

In an embodiment, one or more Application Programming Interfaces (APIs) are built between live traffic data and the return prediction system 102. These APIs serve as the bridge between the live traffic data sources and the return prediction system 102, enabling seamless communication and data exchange between two components.

The primary objective of the APIs is to provide a standardized interface through which live traffic data can be accessed, processed, and ingested into the return prediction system 102 in real-time. The live traffic data may include a variety of information sources, such as website traffic, clickstream data, traffic related social media interactions, and online user behavior.

By leveraging the APIs, the return prediction system 102 can effectively retrieve live traffic data from external sources and incorporate it into the prediction models and analytic workflows. This enables the return prediction system 102 to dynamically adapt to changing market conditions, emerging trends, and customer behaviors.

In some non-limiting embodiments, the APIs enable seamless integration with a wide range of live traffic data sources including third-party analytics platforms, social media APIs, web analytics tools, and IoT devices.

In accordance with the embodiment, customer logging into an application or a mobile app provides consent for sharing the location purchase and delivery, which is used as variable to find the live traffic information at the time of delivery.

Weather data is retrieved from meteorological agencies (weather.com for specific countries) or weather APIs. Weather data may include variables such as, temperature, precipitation, humidity, wind speed, and atmospheric pressure. Weather data is matched with transaction timestamps or location information to align with customer interactions. Weather related information such as, temperature extremes, precipitation levels or seasonal indicators (e.g., winter, summer) are incorporated into the dataset.

In an exemplary embodiment, when a product ordered by a customer has to be delivered at a particular time and weather forecast indicates heavy rains at that time, there is a chance that the product packing may get damaged which results in returning the product. So, the retailers can use this information while predicting the returns so that additional or separate packing can be used during this period to reduce the returns.

Macro-economic indicator data is gathered from reliable sources such as government agencies, central banks, or economic research institutions. Examples of macroeconomic indicators include GDP growth rates, inflation rates, unemployment rates, and consumer confidence indices. Macroeconomic indicators are aligned with transaction timestamps or relevant time periods to capture their impact on consumer behavior.

In an exemplary embodiment, during economic downturns, customers may be more likely to return non-essential items or reduce overall spending, leading to higher return rates. Conversely, during periods of economic prosperity, return rates may decrease as customers feel more financially secure and are less inclined to return purchases. Analyzing these macroeconomic indicators alongside customer data allows for more accurate predictions of product returns and better strategic planning for e-commerce businesses.

The prediction module 212 may comprise suitable logic, and/or interfaces that is configured to process the obtained static data and dynamic data using the ensemble of machine learning models to generate a prediction indicating a likelihood of the product being returned.

In an embodiment, the ensemble of machine learning models includes the plurality of base classifiers and a meta-classifier. The base classifiers refer to individual learning algorithms or models that are trained to make predictions independently. The base classifiers may utilize different algorithms, feature representations, or training strategies, thereby offering diverse interpretations and predictions on the underlying data. The trained base classifiers generate predictions for each instance in the dataset, which are aggregated by the meta-classifier. The meta-classifier may employ various aggregation strategies such as, for instance, rating, averaging, weighted averaging, to synthesize the collective insights from the base classifiers into a prediction.

Performance of the meta-classifier is validated using cross-validation or holdout validation techniques to ensure its robustness and generation capability. Cross validation is a statistical technique used to evaluate the performance of predictive models by partitioning the available dataset into multiple subsets, or folds, and systematically training and testing the model on different subsets of the data. The most commonly used form of cross-validation is k-fold cross validation, where the dataset is divided into k equally sized folds, and the model is trained and k times, each time using a different fold as the validations set and the remaining folds as the training set.

By validating the performance of the meta-classifier using cross-validation techniques, the return prediction system 102 ensures its robustness and generation capability across different subsets of data.

In some non-limiting embodiments, during cross-validation, various evaluation metrics are used to assess the performance of the meta-classifier, including accuracy, precision, recall, F1-score, and area under the receiver operating characteristics curve (ROC-AUC). These evaluation metrics ensure that the insights provided by the meta-classifier are trustworthy and reliable.

In some non-limiting embodiments, the base classifiers can be such as, but not limited to, decision tress, logistic regression, k-nearest neighbors classification, support vector machines (SVM), Naïve bayes, and neural networks.

In some non-limiting embodiments, the meta-classifier can be such as, but not limited to, voting classifier, boosting classifier, bagging classifier, and neural network ensemble.

In an embodiment, a model training module of the return prediction system 102 is configured to train the meta-classifier using a training dataset, which teaches the meta-classifier regarding how to make return predictions. The model training module splits data from the training dataset into a training set and a validation set, and performs feature selection and/or feature engineering on the training set to train the plurality of base classifiers. Performing feature selection or feature engineering involves creating new features or transforming existing ones in the training dataset, which includes operations such as, but not limited to, feature creation, feature transformation, handling categorical variables, dealing with missing values, and feature scaling.

The model training module then optimizes hyperparameters of the plurality of base classifiers based on performance of the validation set. Optimizing the hyperparameters enhances the performance and accuracy of the plurality of base classifiers by finding optimal combination of parameters for the given data.

In accordance with the embodiment, the training dataset typically consists of two main components, input features and product return labels as target variables. Input features are variables or attributes that the model uses to make predictions or classifications. For instance, input features may include numerical values, categorical variables, text data, or any other type of information. Target labels are the outcomes or labels that the stacking classification model is trying to predict or classify based on the input features. Target labels may be binary (Yes/No, True/False), categorical (classes, categories), or continuous (numerical values).

In another embodiment, a model retraining module of the return prediction system 102 is configured to periodically retrain the meta-classifier using actual product return data to improve the accuracy of the prediction. The actual product return data may include information about one or more products that are returned by the customers.

During the retraining process, the meta-classifier analyzes new data and adjusts its parameters or updates its algorithm to better understand patterns in the return behavior of products. The model retraining module, by periodically retraining the meta-classifier, continually improves the accuracy of predictions by incorporating latest information, ensuring that the meta-classifier stays relevant and effective over time.

The prediction module 212, before processing, may initiate preprocessing the data using the preprocessing module 212*a*. Preprocessing the data may comprise one or more steps, such as cleaning the data, normalizing or scaling numerical features, converting categorical variables into numerical representations, and creating new features or transforming existing features.

Cleaning the data involves identifying and handling missing or erroneous data points in the dataset. This may include removing or imputing missing values, correcting inaccuracies, and addressing outliers that could potentially alter the analysis results.

Normalizing or scaling numerical features in the dataset may have different scales or units of measurement, which can lead to issues during analysis. Normalizing or scaling involves transforming them to a standard scale or range, such as between 0 and 1, to ensure consistency and comparability across different features.

Many machine learning algorithms require numerical input data, but categorical variables are often represented as text labels. To address this, categorical variables are converted into numerical representations through techniques such as, but not limited to, one-hot encoding or label encoding.

Feature engineering is a critical aspect of data preprocessing, involving the creation of new features or the transformation of existing features to better capture underlying patterns and relationships in the data, or applying mathematical transformations to improve model performance.

The preprocessing module 212*a* is also configured to perform dimensionality reduction on the data using at least one of Linear Discriminant Analysis (LDA) and autoencoder. The LDA and autoencoder techniques help to identify linear combinations of features that best discriminate between products that are likely to be returned and those that are not.

The LDA is a common process for feature extraction, which can well remain the discriminant information of original data and is usually used to perform the preprocessing of data classification. LDA is a supervised dimensionality reduction technique that aims to find the linear combinations of features that best separate different classes or categories in the data. LDA identifies the direction (linear discriminants) that maximize the separation between classes while minimizing the within-class scatter.

Autoencoders are a type of unsupervised dimensionality reduction technique that learns a compact representation of the input data from a lower-dimensional latent space. The autoencoders consist of an encoder network that compresses the input data into a lower-dimensional representation (encoding) and a decoder network that reconstructs the original data from the encoded representation.

During preprocessing stage, the autoencoders are trained on the data to learn a compressed representation that captures the essential features and patterns in the data. By encoding the input data into a lower-dimensional latent space, autoencoders efficiently reduce the dimensionality of the data while preserving important information, making it easier for ML models to learn from the reduced feature space.

These techniques are valuable for predicting product returns in e-commerce by reducing the complexity of the feature space while preserving important information. Thus, these methods improve model interpretability, and potentially enhance predictive performance by focusing on the most informative features related to product returns.

The prediction module 212 analyzes the static data to retrieve patterns, trends, and correlations that may impact return behavior. For example, by examining past return patterns for specific product categories or customer segments, the prediction module 212 can identify common return triggers, such as sizing issues, product defects, or mismatched customer expectations.

The prediction module 212 leverages the dynamic data to capture emerging patterns, shifts in consumer behavior, and external influences that may impact return behavior. For example, by monitoring real-time website traffic and click-stream data, the prediction module 212 can identify fluctuations in customer engagement, browsing behavior, and purchasing patterns that may signal potential return triggers.

The prediction module 212 may generate the prediction at one or more instances such as, before a purchase of the product is made by the customer, or after the purchase of the product but before the product is being delivered.

The notification module 214 may comprise suitable logic, and/or interfaces that is configured to send notifications to the customer and/or the retailer associated with the product, providing timely updates and alerts related to return predictions and relevant actions.

For customers, the notification module 214 sends proactive notifications regarding potential return scenarios or relevant recommendations to optimize their shopping experience. These notifications might include, for example, if a product is predicted to have a high likelihood of being returned due to sizing issues or quality concerns, the customer may receive a notification advising them to review product details or consider alternative options.

Additionally, the notification module 214 sends real-time notifications to customers while the product is still in their cart if the return prediction system 102 detects a potential likelihood of the return. This proactive measure aims to provide transparency and personalized assistance throughout the shopping journey, ultimately reducing return rates and improving overall customer satisfaction.

Customers might also receive personalized recommendations tailored to their preferences and purchasing history. These recommendations might suggest alternative options or products, or complimentary items based on past interactions and behavioral patterns.

For retailers, the notification module 214 sends proactive notifications for managing returns and optimizing operational efficiency. The notifications might include, for example, adjusting inventory levels, optimizing pricing strategies, or implementing targeted marketing campaigns, to mitigate the impact of returns and maximizing profitability. In some instance, retailers might also receive a notification related to inventory management, such as low stock alerts, replenishment reminders, or suggestions for optimizing product assortment. By staying informed about inventory levels and demand trends, retailers can ensure adequate stock availability and minimize stockouts or overstock situations that can lead to returns. Furthermore, retailers receive notifications about feedback and reviews related to products, that provide valuable insights into customer satisfaction levels, product quality, and potential areas for improvement, enabling retailers to address concerns proactively and enhance the overall shopping experience.

Figure 3:
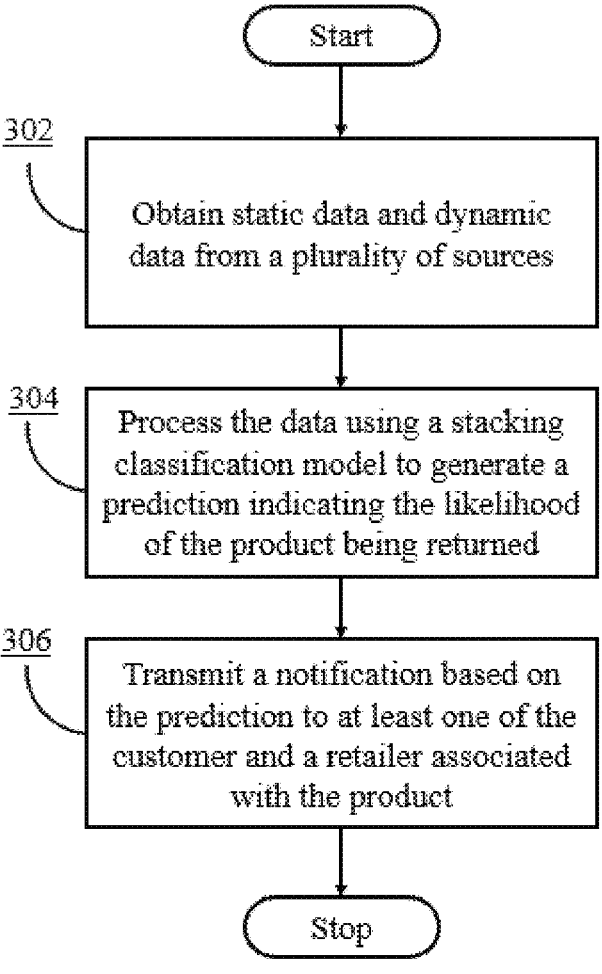
FIG. 3 is a diagram that illustrates a flow chart 300 for a computer-implemented method for predicting a likelihood of return of a product, in accordance with an embodiment of the disclosure.

FIG. 3 is a diagram that illustrates a flow chart 300 for a computer-implemented method for predicting a likelihood of return of a product, in accordance with an embodiment of the disclosure.

At step 302, data associated with the product is obtained by the data acquisition module 210, wherein the data comprises static data and dynamic data obtained from a plurality of data sources.

Static data can be such as, but not limited to, customer data, product data, and Unified ID data. Customer data can further comprise demographic information, purchase history and browsing behavior. By segmenting customers based on demographics such as age, gender, and location, businesses can identify trends in return behavior among different demographic groups. For example, young customers might be more likely to return items due to fit or style preferences. Analyzing customer's past purchases and browsing behaviors help identify their preferences and interest. By understanding which products customers have previously purchased or shown interest in, retailers can anticipate their future purchasing decisions and potential return behavior.

Product data includes, but is not limited to, product attributes, product descriptions and images. Different product attributes such as size, color, brand, and material can influence return rates. For example, clothing items with sizing variations may result in higher return rates due to fit issues.

Accurate product descriptions and high-quality images are essential for setting accurate customer expectations. Misleading product descriptions or low quality can lead to higher return rates as customers may receive products that differ from what they expected.

Unified ID data refers to incorporating the data into the dataset to link individual customers across multiple devices or platforms, which provide a holistic view of customer behavior and interactions. Unified ID data is matched with customer profiles or transaction records using unique identifiers such as, for example, customer IDs, email addresses, etc. Unified ID-related features such as, cross-device interactions, user preferences, and customer journeys are included in the combined dataset, which indicates additional data other than cookies which will give holistic view of customer behavior and interaction.

Dynamic data can be such as, but not limited to, transaction data, cookie data, live traffic data, weather data, and macro-economic indicator data. Transaction data further comprises order history and payment methods, shipping and return information. Analyzing a customer's past orders and payment methods provides insights into their purchasing behavior and preferences. For example, customers who frequently use expedited shipping options may have different return patterns than those who opt for standard shipping. Tracking shipping and return data helps businesses identify potential pain points in the fulfillment process that may lead to returns. For example, delays in shipping or issues with delivery accuracy can result in higher return rates.

Cookie data is collected from one or more website tracking tools or server logs. Cookie data may include information about user sessions, browsing behavior, and interactions with the website. Cookie data is linked with customer data using unique identifiers such as, for example, user IDs, session IDs, etc. Cookie data metrics such as, for example, session duration, pages viewed are aggregated over relevant time intervals. Cookie related features such as browsing patterns, session duration, and click-through rates, are included in the dataset.

Live traffic data is considered to be more relevant in the prediction of returns for specific types of products where a customer needs delivery during a particular time window. Live road traffic data can impact product returns in ecommerce by delaying delivery times, leading to customer dissatisfaction and potential returns due to missed delivery windows or urgent needs. Additionally, increased traffic may result in delivery vehicles being stuck in transit, causing delays or even damage to products, prompting customers to return products.

In an embodiment, one or more Application Programming Interfaces (APIs) are built between live traffic data and the return prediction system 102. These APIs serve as the bridge between the live traffic data sources and the return prediction system 102, enabling seamless communication and data exchange between two components.

The primary objective of the APIs is to provide a standardized interface through which live traffic data can be accessed, processed, and ingested into the return prediction system 102 in real-time. The live traffic data may include a variety of information sources, such as website traffic, clickstream data, traffic related social media interactions, and online user behavior.

By leveraging APIs, the return prediction system 102 can effectively retrieve live traffic data from external sources and incorporate it into the prediction models and analytic workflows. This enables the return prediction system 102 to dynamically adapt to changing market conditions, emerging trends, and customer behaviors.

In some non-limiting embodiments, the APIs enable seamless integration with a wide range of live traffic data sources including third-party analytics platforms, social media APIs, web analytics tools, and IoT devices.

In accordance with the embodiment, customer logging into an application or a mobile app provides consent for sharing the location purchase and delivery, which is used as variable to find the live traffic information at the time of delivery.

Weather data is retrieved from meteorological agencies (weather.com for specific countries) or weather APIs. Weather data may include variables such as, temperature, precipitation, humidity, wind speed, and atmospheric pressure. Weather data is matched with transaction timestamps or location information to align with customer interactions. Weather related information such as, temperature extremes, precipitation levels or seasonal indicators (e.g., winter, summer) are incorporated into the dataset.

Macro-economic indicator data is gathered from reliable sources such as government agencies, central banks, or economic research institutions. Examples of macroeconomic indicators include GDP growth rates, inflation rates, unemployment rates, and consumer confidence indices. Macroeconomic indicators are aligned with transaction timestamps or relevant time periods to capture their impact on consumer behavior.

In an exemplary embodiment, during economic downturns, customers may be more likely to return non-essential items or reduce overall spending, leading to higher return rates. Conversely, during periods of economic prosperity, return rates may decrease as customers feel more financially secure and are less inclined to return purchases. Analyzing these macroeconomic indicators alongside customer data allows for more accurate predictions of product returns and better strategic planning for e-commerce businesses.

The prediction module 212 is configured to process the obtained static data and dynamic data using the ensemble of machine learning models to generate a prediction indicating a likelihood of the product being returned.

At step 304, the obtained data is preprocessed using the preprocessing module 212a and processed by the prediction module 212 to generate a prediction indicating the likelihood of the product being returned.

In an embodiment, the ensemble of machine learning models includes the plurality of base classifiers and the meta classifier. The base classifiers refer to individual learning algorithms or models that are trained to make predictions independently. The base classifiers may utilize different algorithms, feature representations, or training strategies, thereby offering diverse interpretations and predictions on the underlying data. The trained base classifiers generate predictions for each instance in the dataset, which are aggregated by the meta-classifier. The meta-classifier may employ various aggregation strategies such as, for instance, rating, averaging, weighted averaging, to synthesize the collective insights from the base classifiers into a prediction.

In some non-limiting embodiments, the base classifiers can be such as, but not limited to, decision tress, logistic regression, k-nearest neighbors classification, support vector machines (SVM), Naïve bayes, and neural networks.

In some non-limiting embodiments, the meta-classifier can be such as, but not limited to, voting classifier, boosting classifier, bagging classifier, and neural network ensemble.

In an embodiment, the meta-classifier is trained using a training dataset, that serves as the basis for teaching the model how to make predictions or classifications. The training dataset typically consists of two main components, input features and target labels. Input features are variables or attributes that the model uses to make predictions or classifications. For instance, input features may include numerical values, categorical variables, text data, or any other type of information. Target labels are the outcomes or labels that the stacking classification model is trying to predict or classify based on the input features. Target labels may be binary (Yes/No, True/False), categorical (classes, categories), or continuous (numerical values).

Preprocessing the data may comprise one or more steps, such as cleaning the data, normalizing or scaling numerical features, converting categorical variables into numerical representations, and creating new features or transforming existing features.

Cleaning the data involves identifying and handling missing or erroneous data points in the dataset. This may include removing or imputing missing values, correcting inaccuracies, and addressing outliers that could potentially alter the analysis results.

Normalizing or scaling numerical features in the dataset may have different scales or units of measurement, which can lead to issues during analysis. Normalizing or scaling involves transforming them to a standard scale or range, such as between 0 and 1, to ensure consistency and comparability across different features.

Many machine learning algorithms require numerical input data, but categorical variables are often represented as text labels. To address this, categorical variables are converted into numerical representations through techniques such as, but not limited to, one-hot encoding or label encoding.

Feature engineering is a critical aspect of data preprocessing, involving the creation of new features or the transformation of existing features to better capture underlying patterns and relationships in the data, or applying mathematical transformations to improve model performance.

Preprocessing the data further includes performing dimensionality reduction on the data using at least one of Linear Discriminant Analysis (LDA) and autoencoder. The LDA and autoencoder techniques help to identify linear combinations of features that best discriminate between products that are likely to be returned and those that are not.

At step 306, the notification module 214 transmits a notification based on the prediction to the customer and/or a retailer associated with the product.

For customers, the notification module 214 sends proactive notifications regarding potential return scenarios or relevant recommendations to optimize their shopping experience.

For retailers, the notification module 214 sends proactive notifications for managing returns and optimizing operational efficiency. Furthermore, retailers receive notifications about feedback and reviews related to products, that provide valuable insights into customer satisfaction levels, product quality, and potential areas for improvement, enabling retailers to address concerns proactively and enhance the overall shopping experience.

The present disclosure is advantageous in that it prevents product returns from happening in the retail and e-commerce industries by leveraging advanced ML algorithms and predictive analytics techniques. The disclosure anticipates potential return scenarios before they occur, enabling retailers to mitigate return risks and optimize customer satisfaction.

Moreover, one of the significant advantages of the disclosure is that it introduces a novel approach to prediction by harnessing the collective power of both diverse base classifiers, and a meta-classifier. While existing solutions rely on single classifiers and simplistic prediction models, the disclosure leverages ensemble learning techniques to combine strengths and wisdom of multiple base classifiers and enhance predictive performance.

Another distinct advantage of the disclosure is that it introduces a novel approach by acquiring both static and dynamic variables into predictive analytics framework. While traditional methods typically focus on static variables, the present disclosure recognizes the importance of incorporating dynamic variables, to enhance predictive accuracy and responsiveness.

Furthermore, the disclosure is advantageous in that it provides tailored recommendations to customers to mitigate product returns. By leveraging advanced ML techniques, the disclosure analyzes customer preferences, past behavior, and predicted return likelihood to deliver personalized product suggestions and recommendations.

Those skilled in the art will realize that the above-recognized advantages and other advantages described herein are merely exemplary and are not meant to be a complete rendering of all of the advantages of the various embodiments of the present disclosure.

In the foregoing complete specification, specific embodiments of the present disclosure have been described. However, one of ordinary skill in the art appreciates that various modifications and changes can be made without departing from the scope of the present disclosure. Accordingly, the specification and figures are to be regarded in an illustrative rather than a restrictive sense. All such modifications are intended to be included within the scope of the present disclosure.

What is claimed is:

1. A computer-implemented method, comprising:
obtaining data associated with a product, wherein
    the data comprises static data and dynamic data from a plurality of data sources,
    the static data comprises customer data, product data of the product, and unified ID data, and
    the dynamic data comprises transaction data, cookie data, live traffic data, weather data, and macroeconomic indicator data;
processing the data using an ensemble of machine learning models to generate a prediction indicating a likelihood of the product being returned, wherein
    the ensemble of machine learning models comprises a plurality of base classifiers and a meta-classifier, and
    the plurality of base classifiers are selected from the group consisting of decision trees, logistic regression, random forests, and gradient boosting,
    the processing of the data to generate the prediction comprises:
        generating an individual prediction by each base classifier of the plurality of base classifiers; and
        aggregating, by the meta-classifier, the individual prediction of each base classifier of the plurality of base classifiers to generate the prediction indicating the likelihood of the product being returned, and
    the generation of the prediction is at least one of:
        before a purchase of the product by a customer, or
        after the purchase of the product and before delivery of the product; and
transmitting a notification, based on the prediction, to at least one of the customer or a retailer associated with the product.

2. The method of claim 1, further comprising preprocessing the data before the processing of the data, wherein the preprocessing the data comprises at least one of:
    cleaning the data;
    normalizing or scaling numerical features in the data;
    converting categorical variables in the data into numerical representations; and
    creating new features or transforming existing features of the data.

3. The method of claim 2, wherein the preprocessing the data further comprises performing dimensionality reduction on the data using at least one of Linear Discriminant Analysis (LDA) or autoencoder.

4. The method of claim 1, wherein
in a case where the generation of the prediction is before the purchase of the product, the notification is transmitted to the customer, and
the notification comprises recommended actions for the customer to mitigate the likelihood of the product being returned.

5. The method of claim 1, wherein
in a case where the generation of the prediction is after the purchase of the product and before the delivery of the product, the notification is transmitted to the retailer.

6. The method of claim 5, wherein
the notification comprises recommended actions for the retailer to mitigate the likelihood of the product being returned, and
the recommended actions include at least one of:
    adjusting shipment timing and shipment packaging based on predicted shipment conditions;
    communicating with the customer regarding potential issues related to the shipment or the product; and
    taking preemptive measures to address factors that may contribute to the likelihood of the product being returned.

7. The method of claim 1, further comprising training the meta-classifier using a training dataset.

8. The method of claim 7, wherein the training of the meta-classifier comprises:
    splitting the data into a training set and a validation set;
    performing feature selection or feature engineering on the training set;
    training the plurality of base classifiers using the training set; and
    optimizing hyperparameters of the plurality of base classifiers based on performance on the validation set.

9. The method of claim 8, wherein the training of the meta-classifier further comprises:
    optimizing parameters of the meta-classifier based on the performance on the validation set.

10. The method of claim 1, further comprising periodically retraining the meta-classifier using actual product return data.

11. A return prediction system, comprising:

a memory comprising computer readable instructions;

a processor operatively coupled to the memory, wherein the processor is configured to:

obtain data associated with a product, wherein the data comprises static data and dynamic data, the static data comprises customer data, product data of the product, and unified ID data, and the dynamic data comprises transaction data, cookie data, live traffic data, weather data, and macroeconomic indicator data;

control an operation to process the data by an ensemble of machine learning models to generate a prediction indicating a likelihood of the product being returned, wherein the ensemble of machine learning models comprises a plurality of base classifiers and a meta-classifier, the plurality of base classifiers are selected from the group consisting of decision trees, logistic regression, random forests, and gradient boosting, the operation to process the data to generate the prediction comprises:

generation of an individual prediction by each base classifier of the plurality of base classifiers; and aggregation, by the meta-classifier, of the individual prediction of each base classifier of the plurality of base classifiers to generate the prediction indicating the likelihood of the product being returned, and the generation of the prediction is at least one of:

before a purchase of the product by a customer, or after the purchase of the product and before delivery of the product; and control transmission of a notification, based on the prediction, to at least one of the customer or a retailer associated with the product.

12. The return prediction system of claim 11, wherein the processor is further configured to control an operation to preprocess the data before the control of the operation to process the data, and the operation to preprocess the data includes at least one of:

an operation to clean the data;

an operation to normalize or scale numerical features in the data;

an operation to convert categorical variables in the data into numerical representations; and an operation to create new features or to transform existing features of the data.

13. The return prediction system of claim 12, wherein the processor is further configured to perform dimensionality reduction on the data based on at least one of Linear Discriminant Analysis (LDA) or autoencoder.

14. The return prediction system of claim 11, wherein the processor is further configured to train the meta-classifier based on a training dataset.

15. The return prediction system of claim 14, wherein the processor is further configured to:

split the data into a training set and a validation set;

perform feature selection or feature engineering on the training set;

train the plurality of base classifiers based on the training set; and optimize hyperparameters of the plurality of base classifiers based on performance on the validation set.

16. The return prediction system of claim 15, wherein the processor is further configured to:

optimize parameters of the meta-classifier based on the performance on the validation set.

17. The return prediction system of claim 11, wherein the processor is further configured to periodically retrain the meta-classifier based on actual product return data.

* * * * *